United States Patent Office 3,772,279
Patented Nov. 13, 1973

3,772,279
4-OXO-1,2,3-BENZOTRIAZINE-3-PROPIONIC
ACIDS AND ESTERS
Faizulla G. Kathawala, West Orange, N.J., assignor to
Sandoz-Wander, Inc., Hanover, N.J.
No Drawing. Continuation of abandoned application Ser.
No. 124,487, Mar. 15, 1971. This application July 24,
1972, Ser. No. 274,313
Int. Cl. C07d 55/08
U.S. Cl. 260—248 AS         35 Claims

ABSTRACT OF THE DISCLOSURE

Disclosed are compounds of the class of 4-oxo-1,2,3-benzotriazine-3-propionic acids and esters thereof, e.g. 6-chloro-4-oxo-1,2,3-benzotriazine-3-β-propionic acid ethyl ester. The compounds have pharmacological activity in animals, e.g. anti-inflammatory activity. The compounds may be prepared, for example, by addition to the corresponding 3-unsubstituted compounds and by reaction of an anthranil amide with sodium nitrite and a strong inorganic acid, e.g. sulfuric acid. The acid forms are preferably prepared from the esters in a known manner.

---

This application is a continuation of application Ser. No. 124,487, filed Mar. 15, 1971 now abandoned.

This invention relates to chemical compounds which are derivatives of 4-oxo-1,2,3-benzotriazines having pharmacological activity in animals, e.g. anti-inflammatory activity, and to pharmaceutical compositions and methods based on said pharmacological activity.

The compounds of the present invention, may be represented by the structural Formula I:

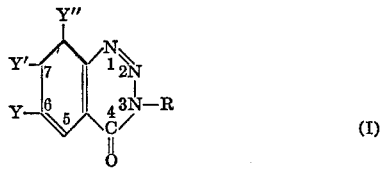

wherein
R is

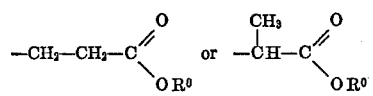

$R^0$ is hydrogen or lower alkyl of 1 to 4 carbon atoms, and Y is hydrogen, halo of atomic weight of from 18 to 80, i.e. fluoro, chloro or bromo, lower alkoxy of 1 to 3 carbon atoms, or nitro;

each of Y' and Y" is hydrogen or lower alkoxy of 1 to 3 carbon atoms, or two of Y, Y' and Y" which are adjacent together form methylenedioxy; provided that Y' and Y" are hydrogen when Y is halo or nitro.

The compounds of the Formula I may be prepared by reacting a compound of the Formula II:

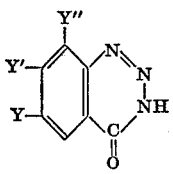

wherein Y, Y' and Y" are as above defined, with a compound of the Formula III:

R—Z           (III)

wherein R is the same as defined above and Z is halo of atomic weight of from 35 to 127 or —OB in which B is methane sulfonyl, benzene sulfonyl or p-toluenesulfonyl, in the presence of a base.

The preparation of compounds I by reacting a compound II with a compound III is suitably carried out at temperatures in the range of from 30° C. to 120° C., typically 40° C. to 80° C., and in the presence of strong base such as sodium hydride, sodium hydroxide and the like. The reaction is conveniently carried out in the presence of an inert organic solvent of conventional type, such as a lower alkanol, e.g. methanol or ethanol. The reaction product of the Formula I may be isolated from the resulting reaction mixture by working up by conventional procedures.

The compounds of the Formula I may be also prepared by reacting a compound of the Formula IV

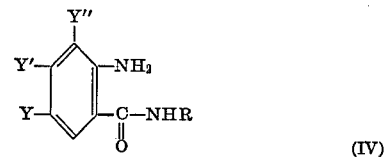

in which R, Y, Y' and Y" are as above defined, with a diazotisation reagent in the presence of a strong acid.

The preparation of compounds I from compounds IV is suitably carried out at temperatures in the range of from minus 30° C. to plus 20° C., typically minus 10° C. to plus 10 °C. The diazotisation reagent is desirably sodium nitrite and the acid employed is most suitably sulfuric acid. The reaction is of known type and the resulting reaction product of the Formula I may be isolated from the resulting reaction mixture by working up by established procedures.

The compounds of the Formula I in which $R^0$ is hydrogen are preferably prepared by subjecting a compound of the Formula I in which $R^0$ is lower alkyl to hydrolysis in a known manner, i.e. in the presence of a dilute saponification in the presence of a dilute solution of a strong base followed by acidification in known manner. Thus, the reaction may be suitably carried out at temperatures in the range of 5° C. to 100° C., typically 40° C. to 80° C. The hydrolysis is effective in an inert organic solvent medium preferably provided by employing a water miscible organic solvent of known type such as a lower alkanol, e.g. methanol or ethanol. The reaction is desirably effected by saponification employing an alkali metal hydroxide such as sodium hydroxide followed by acidification with a strong inorganic acid such as hydrochloric acid. The resulting product may be isolated from the reaction mixture by working up by established procedures.

The compounds of the Formula II are preferably prepared from a compound IV in which R is hydrogen by the procedure above-described for the preparation of compounds I from compounds IV. The compounds of the Formula IV in which R is hydrogen may themselves be prepared in accordance with the following reaction scheme:

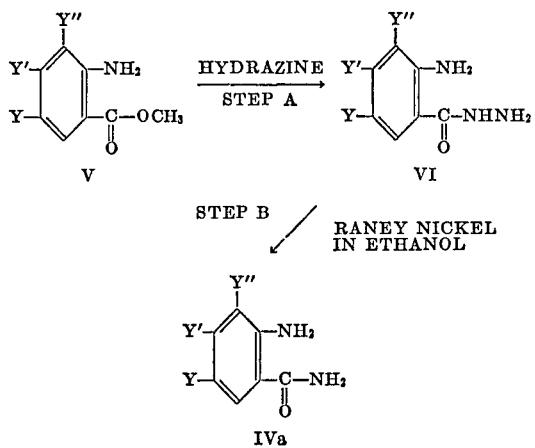

in which Y, T' and T" are as above defined.

The reaction of Step A is of known type and suitably effected at elevated temperatures in the range of 50° C. to 150° C., preferably 80° C. to 130° C. While inert organic solvents of conventional type may be employed it is generally preferred to employ an excess of hydrazine of the solvent for the reaction.

The reaction of Step B is a conventional reduction reaction preferably effected with Raney nickel in an inert organic solvent. The reaction may be effected at temperatures of from 20° C. to 120° C., preferably 50° C. to 100° C. The solvent employed may be any of several of the inert organic solvents, preferably a lower alkanol such as ethanol or methanol.

The intermediates of the Formula IV and those in which R is hydrogen may in general be prepared according to the following process:

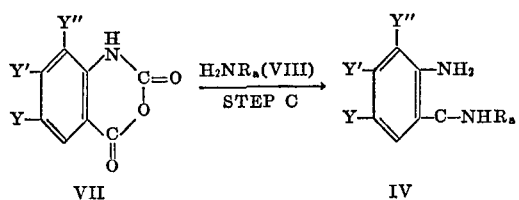

in which $R_a$ includes R as above defined and also hydrogen.

The process of Step C involving the reaction of a compound VII with an amine of the Formula VIII may be effected at temperatures in the range of 20° C. to 120° C., preferably 50° C. to 100° C. The reaction is desirably carried out in the presence of an inert organic solvent which may be any of several of conventional type, preferably a lower alkanol such as methanol or ethanol. When producing compounds IV in which R is hydrogen the compound VIII is ammonia and the solvent system desirably includes or consists of water such that aqueous ammonium hydroxide is preferably employed as the source of both ammonia and solvent. In such cases the reaction is generally carried out at temperatures of from 0° C. to 60° C., preferably 10° C. to 25° C.

The compounds of Formula V and the Formula VII are either known or may be prepared by procedures well established for preparation of the known compounds.

The compounds of Formula I are useful because they possess pharmacological activity in animals. In particular, the compounds I are useful as anti-inflammatory agents as indicated by an inhibition of Carrageenan induced edema in rats and a reduction in foot volume and an improvement in grip strength in the adjuvant arthritis test in rats using *Mycobacteria butyricum* in Freund's adjuvant. For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compound used and the mode of administration. However, in general, satisfactory results are obtained when administered at a daily dosage of from about 2 milligrams to about 200 milligrams per kilogram of body weight, preferably given in divided doses 2 to 4 times a day, or in sustained release form. For most mammals the administration of from about 120 milligrams to about 2000 milligrams of the compound per day provides satisfactory results and dosage forms suitable for internal administration comprise from about 30 milligrams to about 1000 milligrams of the compound in admixture with a solid or liquid pharmaceutical carrier or diluent.

For the above usage, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g. inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet which may be administered four times a day and prepared by conventional tabletting techniques to contain the following ingredients.

| Ingredient: | Weight (mg.) |
|---|---|
| 6 - chloro-4-oxo-1,2,3-benzotriazine-3-β-propionic acid ethyl ester | 100 |
| Tragacanth | 10 |
| Lactose | 147.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

6-chloro-4-oxo-1,2,3-benzotriazine-3-β-propionic acid ethyl ester

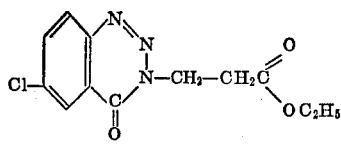

Step A: Preparation of 4-chloro-anthranilamide.—A suspension of 100 g. of 5-chloro-isatoic anhydride in 1250 ml. of dilute ammonium hydroxide solution (prepared from 37 ml. 15.1 N ammonium hydroxide diluted to 1250 ml. with H₂O) was stirred vigorously for 15–20 minutes at room temperature. There is added 2 N sodium hydroxide solution to pH 11 followed by stirring at room temperature for 15 minutes and filtering. The recovered solid material is water washed, and dried under vacuum at 60° C. to give 4-chloro-anthranilamide, M.P. 165–170° C.

Step B: Preparation of 6-chloro-1,2,3-benzotriazin-4(3H)-one.—To a suspension prepared by heating together 22.1 g. of 4-chloro-anthranilamide in 130 ml. of n-propanol and 130 ml. of 3 N sulfuric acid and then cooling to 0–5° C. is added dropwise over one-half hour 10.8 g. of sodium nitrite in 80 ml. of water. The resulting mixture is kept at 0–5° C. for 3 hours and then allowed to stand overnight at room temperature. The mixture is then diluted with water while stirred vigorously and then filtered to recover the precipitate solids which are washed with water, redissolved in 1.5 liters of boiling chloroform/ethanol (1:1) which is filtered while hot. The filtrate is concentrated in vacuo to obtain 6-chloro-1,2,3-benzotriazin-4(3H)-one, M.P. 195–196° C.

Step C: Preparation of 6-chloro-4-oxo-1,2,3-benzotriazine-3-β-propionic acid ethyl ester.—To a suspension of 7.2 g. of 6-chloro-1,2,3-benzotriazin-4(3H)-one in 120 ml. of dimethylacetamide at room temperature is added 2.0 g. of 57% suspension of sodium hydride in mineral oil over a period of about 30 minutes. To the resulting mixture is added 8.8 g. of ethyl - 3-bromopropionate. The resulting mixture is stirred at room temperature for 10 minutes, heated in an oil bath of 135° C. for 2 hours and then poured into ice-water and filtered to recover the precipitated material whtich is crystallized from ethanol to obtain 6-chloro-4-oxo-1,2,3-benzotriazine-3-β-propionic acid ethyl ester, M.P. 45–46° C.

EXAMPLE 2

6-chloro-4-oxo-1,2,3-benzotriazine-3-β-propionic acid

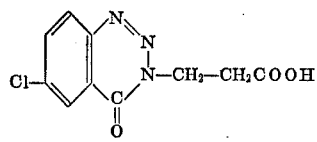

To a solution of 2.0 g. of 6-chloro-4-oxo-1,2,3-benzotriazine-3-β-propionic acid ethyl ester in 4 ml. of water and 90 ml. of ethanol at minus 10° C. is added 2.0 g. of solid sodium hydroxide (pellets). The resulting mixture is stirred at about minus 5° C.–0° C. for 1.5 hours and poured into cold 2 N hydrochloric acid solution. The resulting mixture is filtered and the recovered solid washed with water and recrystallized from ethyl acetate to obtain 6 - chloro - 4 - oxo-1,2,3-benzotriazine-3-β-propionic acid, M.P. 179–182° C.

EXAMPLE 3

Following the procedure of Example 1 the following compounds of the invention are prepared:

(a) 4-oxo-1,2,3-benzotriazine-3-β-propionic acid ethyl ester, M.P. 60–61° C.
(b) 4-oxo-1,2,3-benzotriazine-3-α-propionic acid ethyl ester, M.P. 67–69° C. (from diethyl ether/ligroin).
(c) 6-chloro-4-oxo-1,2,3-benzotriazine-3-α-propionic acid ethyl ester, M.P. 95–97° C. (from diether ether).
(d) 6-nitro-4-oxo-1,2,3-benzotriazine-3-α-propionic acid ethyl ester, M.P. 97–99° C. (from diethyl ether).
(e) 6-nitro-4-oxo-1,2,3-benzotriazine-3-β-propionic acid ethyl ester, M.P. 56–58° C. (from diethyl ether).

EXAMPLE 4

Following the procedure of Example 2 the following compounds of the invention are prepared:

(a) 6-chloro-4-oxo-1,2,3-benzotriazine-3-α-propionic acid, M.P. 168–169° C. (from benzene).
(b) 4-oxo-1,2,3-benzotriazine-3-α-propionic acid, M.P. 175–176° C.
(c) 4-oxo-1,2,3-benzotriazine-3-β-propionic acid, M.P. 192–193° C. (from ethanol).

EXAMPLE 5

6,7-dimethoxy-1,2,3-benzotriazin-4(3H)-one

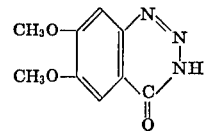

Step A: Preparation of 4,5-dimethoxy-anthranilic acid hydrazide.—A mixture of 50 g. of 4,5-dimethoxymethyl-anthranilate and 200 ml. of anhydrous hydrazine is refluxed for 30 minutes, and then poured onto ice-water. The resulting mixture containing a grey-white precipitate is filtered and the recovered precipitate washed first with ice-cold water, then with diethyl ether and then dried overnight under high vacuum at 70° C. to obtain 4,5-dimethoxy-anthranilic acid hydrazide, M.P. 176–177° C.

Step B: Preparation of 4,5 - dimethoxy-anthranilamide.—A mixture of 43 g. of 3,4-dimethoxyanthranilic acid hydrazide, 205 g. of water-suspended Raney nickel and 600 ml. of absolute ethanol is refluxed under nitrogen until the evolution of ammonia ceased (about 2 hours). The resulting mixture is filtered and the filtrate evaporated in vacuo to dryness. The residue is dissolved in methylene chloride, the solution dried over sodium sulfate and ethanol added to crystallize a material which is washed with diethyl ether to obtain 4,5-dimethoxy-anthranilamide, M.P. 138–140° C.

Step C: Preparation of 6,7-dimethoxy-1,2,3-benzotriazin-4(3H)-one.—To a suspension prepared by heating together 4.0 g. of 4,5-dimethoxy-anthranilamide in 60 ml. of n-propanol and 20 ml. of 3 N sulfuric acid and then cooling to 0–5° C. is added dropwise over one-half hour 1.5 g. of sodium nitrite in 7.0 ml. of water. The resulting mixture is kept at 0–5° C. for 3 hours and then allowed to stand overnight at room temperature. The mixture is then diluted with water while stirred vigorously and then filtered to recover the precipitate solids which are washed with water, redissolved in 1.5 liters of boiling chloroform/ethanol (1:1) which is filtered while hot. The filtrate is concentrated in vacuo to obtain 6,7-dimethoxy-1,2,3-benzotriazin-4(3H)-one, M.P. 273–274° C.

EXAMPLE 6

Following the procedure of Step C of Example 1, the following compounds are prepared from a 3-unsubstituted 1,2,3-benzotriazine-4(3H)-one which is prepared by or analogously to Example 5:

(a) 6,7-dimethoxy-4-oxo-1,2,3-benzotriazine-3-α-propionic acid ethyl ester, M.P. 124–126° C.
(b) 6,7-dimethoxy-4-oxo-1,2,3-benzotriazine-3-β-propionic acid ethyl ester, M.P. 171–173° C.
(c) 6,7,8-trimethoxy-4-oxo-1,2,3-benzotriazine-3-β-propionic acid ethyl ester, M.P. 113–114° C. (crystallized from diethyl ether).
(d) 6,7,8-trimethoxy-4-oxo-1,2,3-benzotriazine-3-α-propionic acid ethyl ester, M.P. 93–95° C. (crystallized from diethyl ether).

EXAMPLE 7

6,7-dimethoxy-4-oxo-1,2,3-benzotriazine-3-β-propionic acid

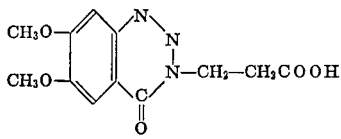

To a solution of 2.0 g. of 6,7-dimethoxy-4-oxo-1,2,3-benzotriazine-3-β-propionic acid ethyl ester in 40 ml. of water and 90 ml. of ethanol at minus 10° C. is added 2.0 g. of solid sodium hydroxide (pellets). The resulting mixture is stirred at about minus 5° C.–0° C. for 1.5 hours and poured into cold 2 N hydrochloric acid solution. The resulting mixture is filtered and the recovered solid washed with water and recrystallized from ethanol to obtain 6,7-dimethoxy-4-oxo-1,2,3-benzotriazine-3-β-propionic acid, M.P. 211–212° C.

EXAMPLE 8

Following the procedure of Example 5, the following are prepared:

(a) 6,7-dimethoxy-4-oxo-1,2,3-benzotriazine-3-α-propionic acid, M.P. 234–235° C. (crystallized from chloroform/diether ether).
(b) 6,7,8-trimethoxy-4-oxo-1,2,3-benzotriazine-3-β-propionic acid, M.P. 168–170° C. (crystallized from ethyl acetate).
(c) 6,7,8-trimethoxy-4-oxo-1,2,3-benzotriazine-3-α-propionic acid, M.P. 162–164° C. (crystallized from ethyl acetate).

What is claimed is:
1. A compound of the formula:

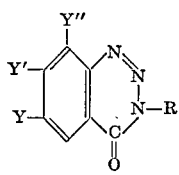

wherein
R is

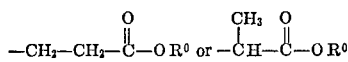

$R^0$ is hydrogen or lower alkyl, and
Y is hydrogen, halo of atomic weight of from 18 to 80, lower alkoxy or nitro,
each of Y' and Y" is hydrogen or lower alkoxy, or two of Y, Y' and Y" which are adjacent together form methylenedioxy while the other is hydrogen; provided that Y' and Y" are hydrogen where Y is halo or nitro.
2. A compound of claim 1 in which Y' and Y" are hydrogen.
3. A compound of claim 2 in which R is

—CH$_2$—CH$_2$—COOR$^0$

4. A compound of claim 3 in which Y is chloro.
5. The compound of claim 4 in which $R^0$ is ethyl.
6. The compound of claim 4 in which $R^0$ is hydrogen.
7. A compound of claim 3 in which Y is hydrogen.
8. The compound of claim 7 in which $R^0$ is ethyl.
9. The compound of claim 7 in which $R^0$ is hydrogen.
10. A compound of claim 3 in which Y is nitro.
11. The compound of claim 10 in which $R^0$ is ethyl.
12. A compound of claim 2 in which R is

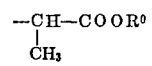

13. A compound of claim 12 in which Y is chloro.
14. The compound of claim 13 in which $R^0$ is ethyl.
15. The compound of claim 13 in which $R^0$ is hydrogen.
16. A compound of claim 12 in which Y is hydrogen.
17. The compound of claim 16 in which $R^0$ is ethyl.
18. The compound of claim 16 in which $R^0$ is hydrogen.
19. A compound of claim 12 in which Y is nitro.
20. The compound of claim 19 in which R" is ethyl.
21. A compound of claim 1 in which Y and Y' are lower alkoxy and Y" is hydrogen.
22. A compound of claim 21 in which R is

—CH$_2$—CH$_2$—COOR$^0$

23. The compound of claim 22 in which $R^0$ is hydrogen and Y and Y' are methoxy.
24. The compound of claim 22 in which $R^0$ is ethyl and Y and Y' are methoxy.
25. A compound of claim 21 in which R is

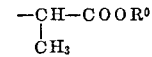

26. The compound of claim 25 in which $R^0$ is hydrogen and Y and Y' are methoxy.
27. The compound of claim 25 in which $R^0$ is ethyl and Y and Y' are methoxy.
28. A compound of claim 1 in which each of Y, Y' and Y" are lower alkoxy.
29. A compound of claim 28 in which R is

—CH$_2$—CH$_2$—COOR0

30. The compound of claim 29 in which $R^0$ is hydrogen and Y, Y' and Y" are methoxy.
31. The compound of claim 29 in which R $^0$ is ethyl and Y, Y' and Y" are methoxy.
32. A compound of claim 28 in which R is

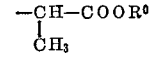

33. The compound of claim 32 in which $R^0$ is hydrogen and Y, Y' and Y" are methoxy.
34. The compound of claim 32 in which $R^0$ is ethyl and Y, Y' and Y" are methoxy.
35. A compound of claim 1 in which Y and Y' together form methylenedioxy.

References Cited

UNITED STATES PATENTS 3,163,646    12/1964    Herlinger et al. _____ 260—248 X
3,316,262     4/1967    Hasspacher et al. _____ 260—248

FOREIGN PATENTS 6,603,319    9/1967    Netherlands.
6,702,189    8/1968    Netherlands.

JOHN M. FORD, Primary Examiner

U.S. Cl. X.R.

424—249